US006526438B1

(12) United States Patent  (10) Patent No.: US 6,526,438 B1
Bienvenu et al.                (45) Date of Patent:      Feb. 25, 2003

(54) METHOD FOR DISTRIBUTING INFORMATION TO SUBSCRIBERS OVER A NETWORK

(75) Inventors: Rodney Bienvenu, Westport, CT (US); Zakhar Khilkevich, Elmhurst, NY (US); Susan Krikston, Norwalk, CT (US); Mikhail Kuzemchenko, Fairfield, CT (US)

(73) Assignee: divine, inc., Chicago, IL (US)

( * ) Notice: Subject to any disclaimer, the term of this patent is extended or adjusted under 35 U.S.C. 154(b) by 0 days.

(21) Appl. No.: 09/351,359

(22) Filed: Jul. 12, 1999

(51) Int. Cl.[7] ............................. G06F 15/16; G06F 7/00
(52) U.S. Cl. ..................................... 709/219; 707/104.1
(58) Field of Search ............................... 709/213–219; 707/9, 10, 104.1; 705/51–52

(56) References Cited

U.S. PATENT DOCUMENTS

| | | | | |
|---|---|---|---|---|
| 5,708,780 A | | 1/1998 | Levergood et al. ......... 709/229 |
| 5,721,906 A | | 2/1998 | Siefert ........................ 707/9 |
| 5,758,355 A | * | 5/1998 | Buchanan ................... 707/1 |
| 5,892,900 A | | 4/1999 | Ginter et al. ............... 713/200 |
| 6,038,668 A | * | 3/2000 | Chipman et al. ............ 380/255 |
| 6,044,372 A | * | 3/2000 | Rothfus et al. ............. 707/10 |
| 6,125,388 A | * | 9/2000 | Reisman ..................... 707/1 |
| 6,182,066 B1 | * | 1/2001 | Marques ..................... 704/10 |
| 6,189,008 B1 | * | 2/2001 | Easty et al. ................ 705/14 |
| 6,236,991 B1 | * | 5/2001 | Frauenhofer et al. ........ 705/10 |
| 6,275,496 B1 | * | 8/2001 | Burns et al. ................ 370/429 |
| 6,405,245 B1 | * | 6/2002 | Burson et al. .............. 345/705 |
| 6,424,979 B1 | * | 7/2002 | Livingston et al. ......... 707/203 |
| 6,453,339 B1 | * | 9/2002 | Schultz et al. .............. 707/10 |

OTHER PUBLICATIONS

Corporate Portals: A Simple View of a Complex World, Plumtree Software, pp. 1–24, Nov. 1998.*
White, M., Portals, Free Pint, No. 58, www.freepint.com/issues/160300.html, pp. 1–16, Mar. 2000.*
Fox, G., Basic Foilset Distributed Objects and Portals for Earthquake Science, old-npac.ucs.indiana.edu/users/gcf/gemcompsciencejune99/foilsepimagedir, pp. 1–51, Jun. 1999.*
Database Modeling & Design 3rd Ed. by Toby J. Teorey; published by Morgan Kaufmann Publishers, 1999, pp. 1–10 and 319–322.

* cited by examiner

Primary Examiner—Andrew Caldwell
(74) Attorney, Agent, or Firm—William C. Crutcher

(57) ABSTRACT

Information items from publishers are furnished to authorized subscribers by processing and storing the information in a central database and logging in each information item. Entitlement tables also are kept which indicate which subscribers are entitled to view the information. Information items which are new or which have not yet been distributed are published on a network distribution server at a central location. The network subscribers have local file servers which contain previously received information items stored in a relational database. Network subscribers who are authorized update their local file servers over the Internet with the undistributed or new information items.

7 Claims, 3 Drawing Sheets

METHOD FOR DISTRIBUTING INFORMATION TO SUBSCRIBERS OVER A NETWORK

BACKGROUND OF THE INVENTION

Figure 1:
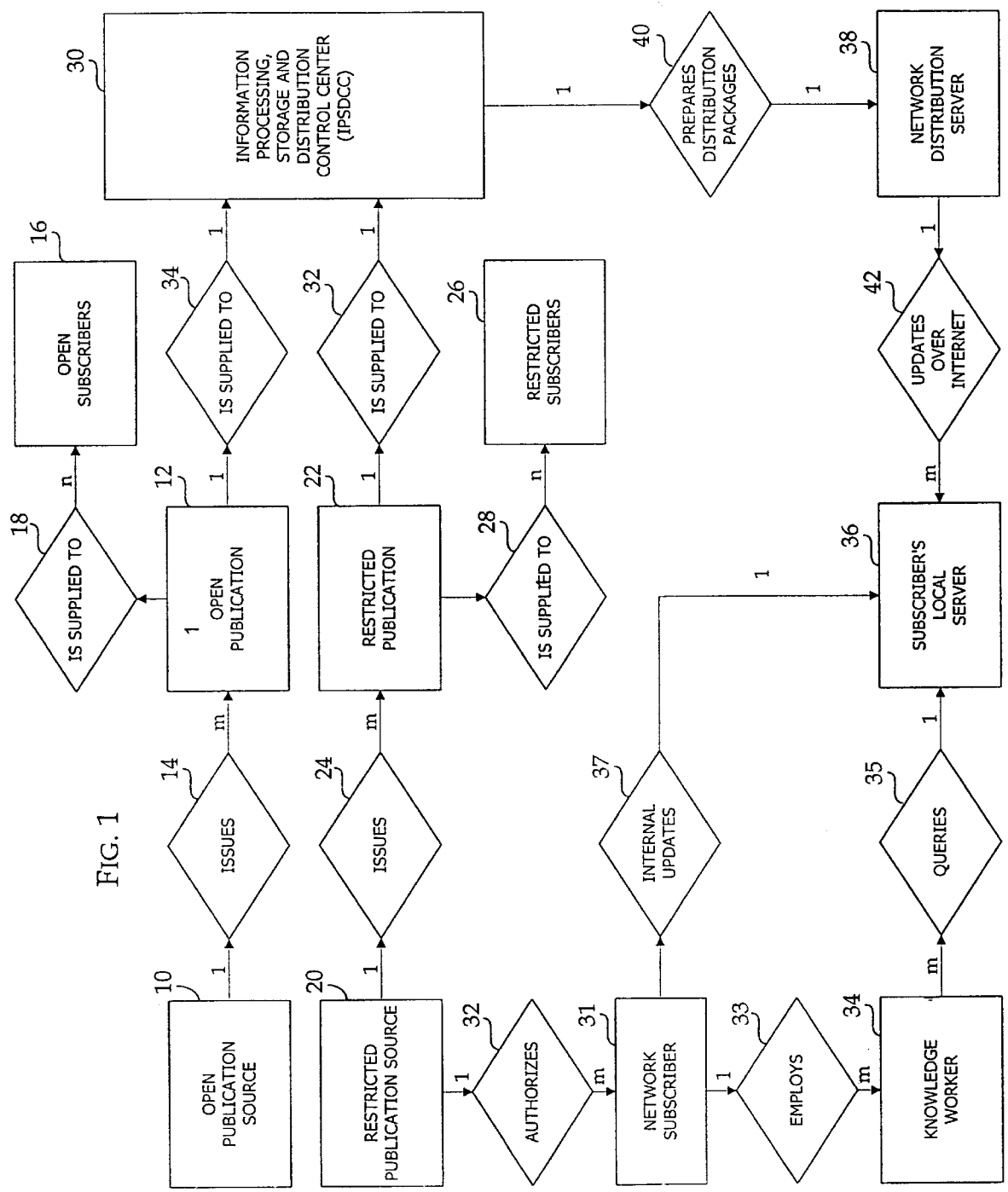

This invention relates generally to a method for distributing timely information to authorized subscribers over a publicly accessible global information network.

In the business environment, information is vital to conducting the business of the enterprise. In order to gather all of the relevant facts, numerical data and expert opinions in a particular field of business, the managers, analysts and other users of information may subscribe to, or otherwise obtain access to, a number of publications and information services in addition to internal sources of information. Examples of information to be gathered and integrated by the knowledge worker in a meaningful fashion include business and financial information on other companies or enterprises in the selected field, prices and price movements, new discoveries and methods, rules and regulations of regulatory authorities, spot information items, tabular economic data, and historical financial data.

Some subscriptions are made through "open" publication sources available to the public. For example, U.S. Government documents can be copied and distributed without concern for copyright or other authorization to use the information.

Other information comes from specialized services business news publishers, or consulting firms which gather and disseminate information to a select group of paid subscribers. Information from such "restricted" publication sources often includes expert opinions and advice which is distributed to its subscribers on a highly controlled basis and is often licensed for use to business enterprises at rates depending upon the number of individual users permitted to view the information.

The business enterprise also has internal sources of data or information. Data is stored, created, and provided across the enterprise in and from a variety of technologies, schemas, and formats, and is accessed utilizing a multitude of Advanced Programming Interfaces (API). From legacy systems, to document management systems, to relational data stores, it is difficult to make the bulk of useful information accessible in ways that make sense to all users, is navigable by all users, and is centrally controllable.

The common interface for integration of external and internal data, display and navigation of information items is sometimes called an enterprise information portal (EIP).

The goals of an EIP should be to create a common, flexible infrastructure, which enables the rapid design, development, and deployment of custom navigational and display components. An enterprise information portal creates a platform upon which a multitude of business applications may provide the informational tools which knowledge workers require to research information, access daily briefings applicable to their work environment of the moment, and be notified of breaking information relevant to that environment. This information must be presented to the user in a common display and navigation environment regardless of its source.

One of the major functions of an EIP is to answer queries posed by users of the system. It is known that the various information items contained in publications from both restricted publication sources and open publication sources, as well as internal information may be gathered, edited, and stored in a relational database. Searches for information items meeting specified criteria are then conducted using Structured Query Language (SQL) which is the ISO-ANSI standard data definition language and data manipulation language for relational database systems. SQL software is produced by Oracle Corporation, Sybase Inc., Microsoft Corporation, IBM and many others.

Much has been written concerning access and searching of relational databases residing on file servers connected as part of a client/server local area network. These local file servers must be updated and maintained by the enterprise. Another type of relational database search system allows for accessing a central database over a publicly accessible global information network, such as the Internet. In most such cases, the relational database resides in a central database storage facility at a remote location. The database is updated and maintained by an information service company, which supplies information to its subscribers in a normalized and unified manner. The remote database may be queried by commands transmitted over a global information network and a response is returned over the global information network to the local client making the query. The response may comprise a series of documents transmitted over the network satisfying the query criteria and which the user is permitted to view and/or copy, generally subject to copyright restrictions. An example of such a system is that offered by the Dialog Corporation. The result of this approach is that the API and data access code clutter that in the days of client server occurred at the client, now occur at the web server. The same issues of very complex, high maintenance code that plagued client side applications in the client server model now plague web server backend code. This is due to the model where data stores are "dumb", and merely respond to queries, and business intelligence resides at the client (or web server) level. Other authors have suggested the use of multiple databases at different locations which are linked together so that a user can search all databases as though they were a single database. Such a system is described in U.S. Pat. No. 5,721,906—Seifert issued Feb. 24, 1998. In this patent, each provider of information at the separate locations of the databases may limit access to the resource by identifying users who are authorized to obtain access to the resource. This is known as "entitlement". In this case, each location independently controls access, which imposes the requirement for each resource to determine and monitor right of access to the information on a continuing basis.

Other systems have been devised for determining whether the user is authorized to access the requested document. Once such entitlement system is described in U.S. Pat. No. 5,708,780 issued Jan. 13, 1998 to Levergood et al. This system involves an authorization indicator imbedded in a session identifier indicating that the user has purchased the subscription in advance. This approach on a document-by-document basis for every session becomes a cumbersome process when multiple documents, multiple queries and multiple users are involved.

Ideally, a client user wishes to query a database which is updated so as to contain the latest information available from each of the publication sources to which the user subscribes. Various publishers update their publications at different times and at different frequencies. It is difficult for an individual subscriber to multiple publications to continuously update a multiple source database to delete obsolete information and incorporate new information. This is best done in a centralized location under control of a disciplined group of information specialists. On the other hand, it is undesirable to transmit entire documents to respond to queries, when most of the information in the document is largely historical and has only been updated to add a small increment of new information. In this case, it would be desirable for the user to have access to a local or in-house file server containing the relational database which has been updated in a timely manner with authorized documents.

Accordingly, one object of the present invention is to provide an improved method for distributing timely information to authorized subscribers of publications over a publicly accessible global information network.

Another object of the invention is to provide an improved method for distributing update information over a global information network to update subscriber databases.

Still another object of the invention is to provide an improved method for sending new information items only to authorized subscribers of restricted publications.

Still another object of the invention is to provide an improved method for categorizing, editing and storing new information items into a central database providing for subsequent identification of undistributed information items.

SUMMARY OF THE INVENTION

The invention comprises a method for distributing timely information in an information distribution system comprising a group of restricted publication sources, a group of authorized subscribers to the publications, an information management enterprise (IME) having an information processing, storage and distribution control center, and a publicly accessible global information network accessible to all of the parties.

The restricted publication sources disseminate publications, each containing at least one information item, which are ultimately destined to reach a list of subscribers who are authorized to receive the publications. The publications are received by, processed in and distributed through an information processing, storage and distribution control center (IPSDCC) of the information management enterprise. The IPSDCC has a computer with relational database storage means for storing a content database, a log entry database, and an entitlement database. Facilities of the IME also include a network distribution server. The authorized subscribers each have access to computer local area networks including a local server with SQL software adapted to answer subscriber queries from an updatable relational database residing on the local server.

Briefly stated, the method comprises the steps of receiving and storing a list of authorized subscribers for each said restricted source in the entitlement database; receiving the publications periodically transmitted by said restricted sources to the IPSDCC; categorizing, editing and storing information items from the publications in said content database; creating and storing a log entry in the log entry database for each said information item having codes assigned to the log entry indicating date of the data item, publication in which the information item appeared, location of the information item in the content database, and whether the information item has been distributed; periodically accessing the log entry database and retrieving corresponding new and undistributed information items; selecting network subscribers authorized to receive the new and undistributed information items from the list of authorized network subscribers in the entitlement database; preparing file transfer packages of both new and undistributed information items for said selected subscribers; distributing the new and undistributed information items by placing the file transfer packages on the network distribution server for access by the subscribers, so as to allow the authorized subscribers to update their updatable relational databases of their local servers over the global information network; and altering the log entries for the new information items to indicate that they were distributed.

In its preferred form, the categorizing, editing and storing step (c) includes the substeps of automatically separating said information items received by the IPSDCC into first information items comprising timely textual views items, second information items comprising structured numerical data and third information items requiring extensive editing or programming. The first information items are stored and distributed automatically.

The method further includes collection of additional publications and storage of additional information items from open publication sources and incorporating them into the process. The method further includes the steps of providing a series of contractual agreements governing entitlement and usage of the restricted information items.

DRAWING

Figure 2:
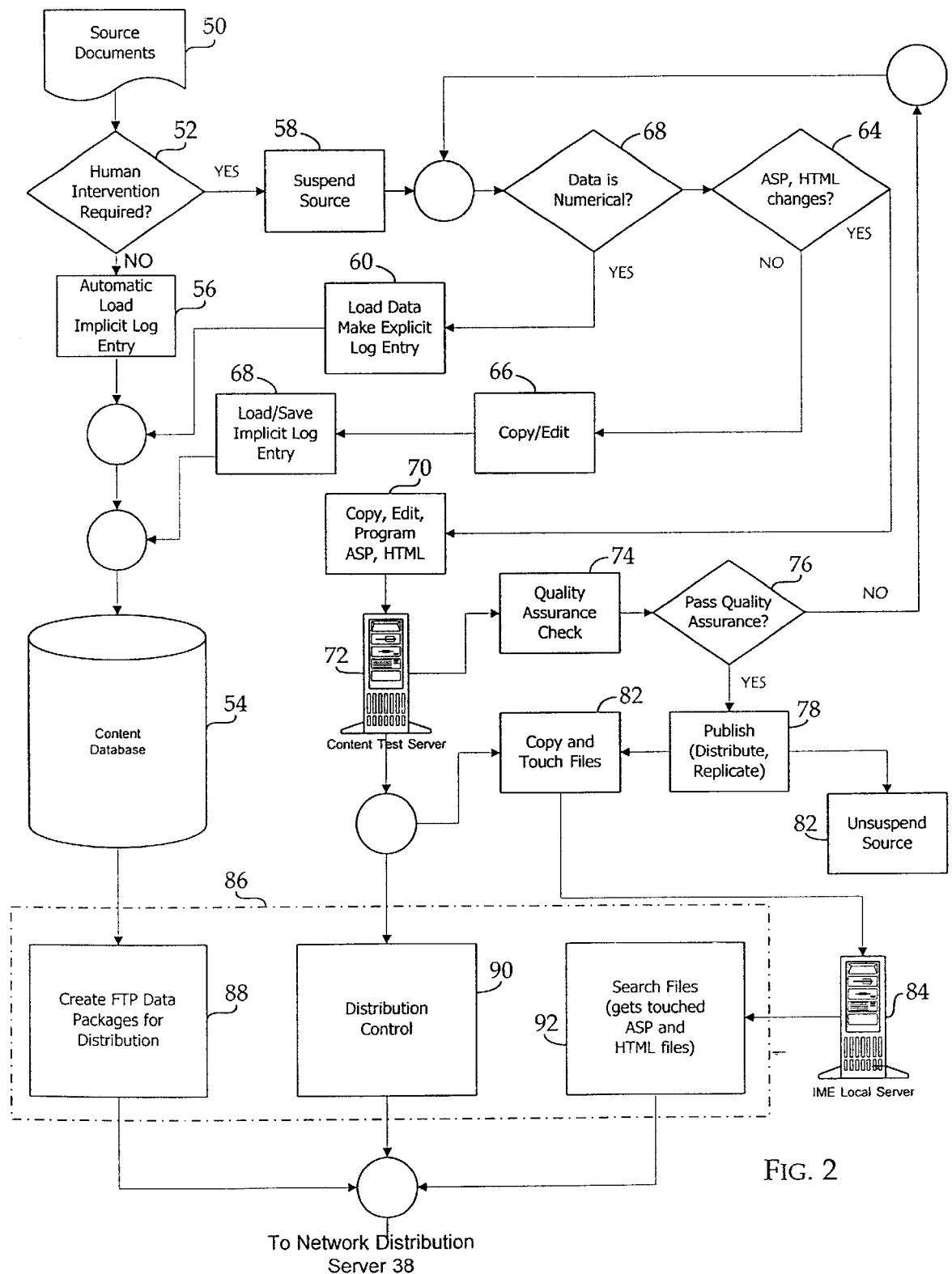
Figure 3:
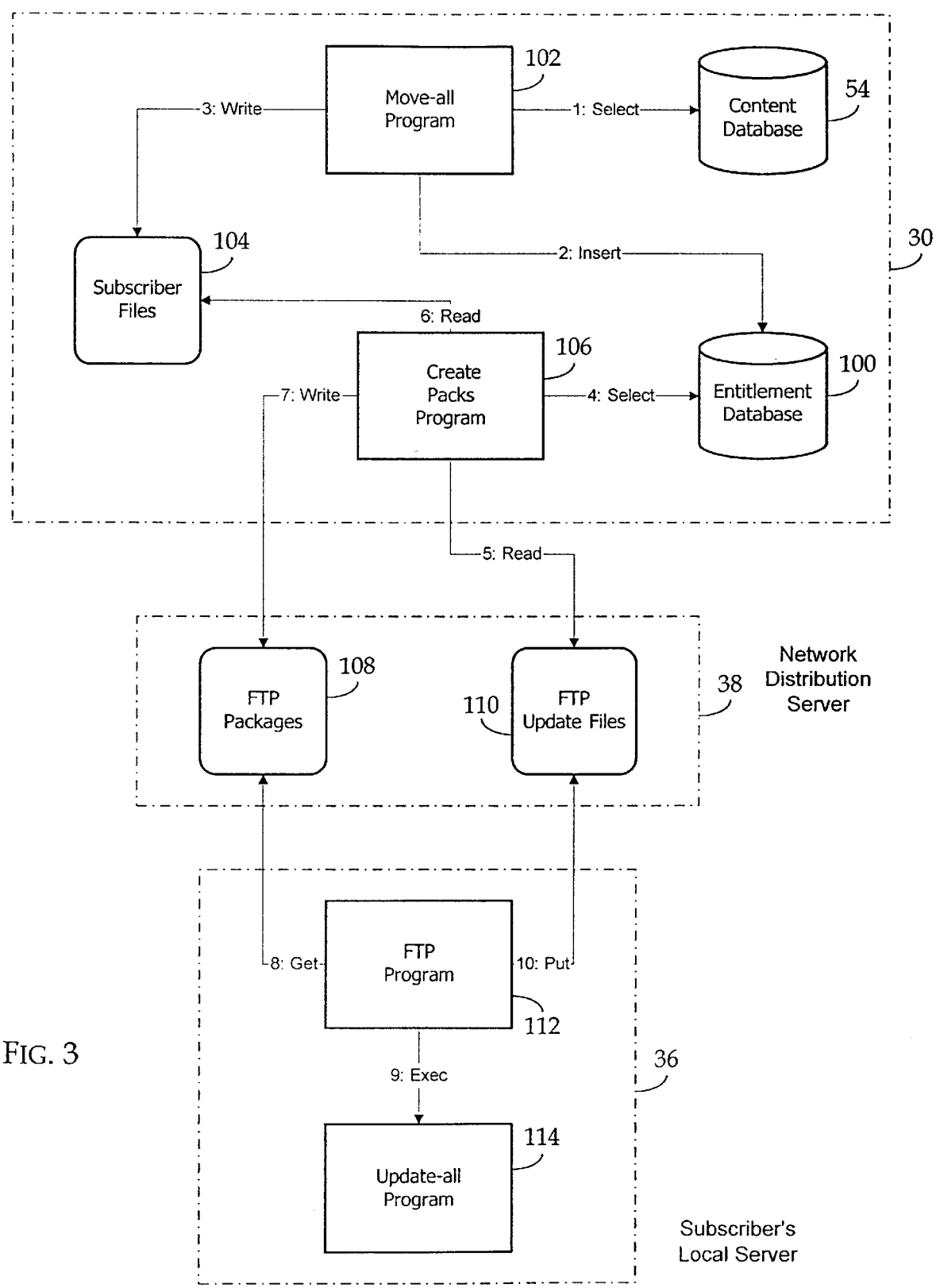

The invention will be better understood by reference to the following description, taken in connection with the accompanying drawings, in which:

FIG. 1 is an entity-relationship model of the overall data distribution system in block diagram form, FIG. 2 is a schematic flow chart of the information processing, storage and preparation for distribution of data within the data distribution organization, and FIG. 3 is a flow chart of the steps to prepare and distribute update packages of data over the global information network.

DESCRIPTION OF THE PREFERRED EMBODIMENT

FIG. 1 is a block diagram of a simplified entity-relationship (ER) model of the overall information distribution system within which the method of the present invention is employed. The ER model is drawn according to the Chen notation using rectangles to represent entities and diamonds to represent relationships between entities. Each reference number for a rectangle identifies one or more entities of the same type. Each reference number for a diamond identifies a relationship between the connected entities. Further reference to the ER model notation may be had by reference to *Database Modeling and Design* by Toby J. Teorey (3rd edition 1999), (Morgan Kaufmann Publishers, Inc.).

Referring to FIG. 1, the block 10 denotes one of an indefinite number of open publication sources publishing information in a selected field. The field might be oil and gas production, energy distribution, metal finishing, plastics, hotel and travel industry or any similar business segment. The information might be financial data, economic data, business data, information items, newsletters, etc. The term "open publication source" indicates that the data is usable without requiring authorization for use and redistribution of the information. Notable examples of open publication sources 10 include federal agencies issuing U.S. Government reports, for example the U.S. Department of Energy.

Block 12 denoted "open publication" indicates one of an indefinite number of open publications. The publications may be in the form of printed matter, e-mail, facsimile images, digitized compressed or uncompressed files, or data residing on a file server suitable for transfer over a network using file transfer protocol (FTP) or similar protocols. The publications contain "information items" which may be textual, e.g., news stories; graphic, e.g., pictures; or numeric, e.g., tables of structured numeric data. An example of an open publication 12 is "U.S. Electricity Supply and Demand", which forecasts and examines the impact of oil price on U.S. electricity supply and demand by various sectors.

The relationship between the entity 10 (open publication source) and the entity 12 (open publication) is denoted by the diamond shaped symbol 14 indicating that the publication source issues publications. A one-to-many relationship is indicated by the connectivity designators "1" and "m", which is a shorthand designation for indicating that each of the publication sources 10 may issue one or more publications 12.

Each of the open publications 12 is then supplied to one or more recipients. The entity 16 indicates such an "open subscriber". The relationship diamond symbol 18 connecting entity 12 and entity 16 in a one-to-many relationship indicates that each open publication 12 may be supplied to one or more open subscribers 16. The term "open subscriber" indicates that little or no restriction as to use and display of the information is imposed upon the recipient, except as may be enforceable under the copyright laws, if applicable.

Information is also available from proprietary publications or similar controlled subscription information sources. In accordance with the present invention, one of an indefinite number of such restricted publication sources, indicated by entity block 20, provides information in the form of restricted publications, denoted by entity block 22. An example of a restricted publication source 20 is Hart Publications, and an example of a restricted publication is "Oxy Fuel News", which is a comprehensive source of market news affecting the worldwide oxygenated fuels industry. Relationship symbol 24 and the connectivity constraints "1" and "m" indicate as before that each restricted publication source issues one or more restricted publications. Each such restricted publication 22 is supplied to one or more restricted subscribers 26 as shown by the relationship 28. The restricted publications contain information items as previously defined.

The flow of information or data denoted by the ER symbols 20, 22, 24, 26, 28 represents a conventional publication or supply of data from a specialized service to a select group of subscribers, using conventional distribution by way of the postal service, courier mail, facsimile, e-mail, modem or direct FTP file transfer via modem or digital link. Typically, the restricted publication source owns proprietary rights in its products and services containing categories of information such as news, price assessments, data, analysis, research and commentary relating to one or more fields or industries which the restricted source maintains and periodically enhances. Subscription by a restricted subscriber 26 to one or more restricted publications 22 normally entails a contractual agreement between restricted publication source 20 and restricted subscriber 26 recognizing the proprietary rights and obligations with respect to information in the restricted publications 22. Such a contractual agreement is defined for the purpose of this invention as a Publisher Subscriber Agreement.

In accordance with the present invention, a restricted publication 22 is also supplied to an information management enterprise (IME) which manages and carries out the business method comprising the present invention. The information management enterprise includes an operating section or workgroup with computer and data storage facilities denoted as an Information Processing, Storage and Distribution Control Center (IPSDCC). This operating section is designated by entity block 30. Relationship symbol 32 denotes that each restricted publication is supplied as a source document to IPSDCC 30. IPSDCC 30 is also supplied with source documents comprising open publications 12 as indicated by relationship symbol 34.

In order to carry out the information processing, storage and distribution control functions necessary to ensure proper handling and entitlement to access of restricted publications, the information management enterprise (IME) enters a contract with each restricted publication source 20 defined herein as an Electronic Distribution Agreement whereby the restricted publication source 20 grants the IME a license to distribute electronically the information contained in restricted publications 22 over an information network. The distribution will only be to entities who have entered into the aforesaid Publisher Subscriber Agreements. The distribution shall furthermore only be made to subscribers who have executed a separate Distributor Service Agreement with the IME. Entitlement to receive electronic distribution of information over the network is indicated in FIG. 1 by an entity 31 designated "network subscriber". Verification of a network subscriber 31 having entered into a Publisher's Subscriber Agreement with restricted publication source 20 is indicated by the "authorizes" relationship 32. The ER symbols indicate that each of the restricted publication sources 20 may have one or more network subscribers 31 which is authorized through a Publisher's Subscriber Agreement.

The network subscribers 31 may be business enterprises having a large number of employees. Only a few knowledge workers are entitled or authorized by their employer to display and view information from preselected restricted sources. As shown in FIG. 1, network subscribers 31 may employ 33 one or more knowledge workers 34.

Each network subscriber 32 has one or more local file servers 36, preferably connected within a local area network (LAN). The local file servers 36 may be updated with internal information items and data as shown by the "update" relationship 35. The application programs and other data banks residing on the subscribers' local file servers 36 are provided and maintained by the IME over the global network. The software provided on the local server will include core software to enable HTML and ASP pages; web server operating software; a relational database management system, such as Oracle; and a search engine, such as Fulcrum. The relational database of information items is complete and timely and responsive to queries made by authorized persons or authorized work groups (knowledge workers 34) employed by or attached to any given network subscriber 31. Queries to the database residing on the local server 36 which are received from knowledge workers 34 are indicated by the relationship 37.

FIG. 1 also illustrates the method for distributing timely information to authorized network subscribers over the global information network and will be described in greater detail in the remainder of the specification. New information items necessary to maintain and update the subscribers' databases are placed on a network distribution server 38. IPSDCC 30 periodically prepares distribution packages of information indicated by symbol 40 in a manner to be described later, and loads them into network distribution server 38. On demand, or at prescribed times, the subscriber's local server 36 is updated and supplied with timely new information over a global information network as indicated by symbol 42.

Operations on Source Documents by IPSDCC

A variety of sources of information confront any enterprise; there are external publications which arrive in a number of formats, from HTML pages on external web sites, to PDF reports which are subscription oriented.

Internal publishers may publish important knowledge in a number of formats, the majority of which will be file based. Very rarely will the publishers register this information with search engines, or supply metadata describing the contents of the document.

External data providers provide raw data, examples of which are price quotes or realtime news. Internal data providers may apply analytics or add value to realtime news, or may provide output form transactional or other internal systems. This data is typically a stream of continuously changing information or events.

Internal or external database providers generally provide stores of structured data, which is provided in either industry standard or proprietary database technologies. This datastore may either be replicable, or may not support replication, and so must be queried directly.

The information management enterprise (IME), through its enterprise information portal (EIP), must support interaction with all of these different sources and stores of knowledge and data, and must be capable of retrieving and searching for data across all of them.

After considering all the different high level sources of knowledge, the next step is to evaluate the incoming publications that are representative of a "piece" of the knowledge store, and to review the information items in the publications. Following are different types of publications contemplated by the present invention.

A "news story" is typically a text block that informs about a given topic. It may have relevance with regard to a topic, a category, a company, and son on. Contextual information may be provided by the source of the news story.

"Reports" are large containers of a number of pieces of information, which may be useful in their own right. The report adds value by consolidation and additional interpretation of the informational components which it contains. The components of a report should be captured, as well as the report itself.

"Structured data" consists of a series of records of numeric data, which may come from any database or spreadsheet. Some number of fields compose each record. The records themselves may be reproduced through a query aimed at the data store where they are kept.

A map or "graphic" is simply a binary object, which may be linked to any other report, news story, geocode or other information, without which it is impossible to intelligently find or locate this information.

A "price quote" is somewhat special, in that it is a record whose value changes continuously and whose value diminishes over time, unless a time series is kept to provide trend or historical information.

FIG. 2 is a flow chart indicating incoming data processing operations within the Information Processing, Storage and Distribution Control Center depicted in block 30 on FIG. 1. Source document input, indicated by flow chart symbol 50, comprises open publications 12 and restricted publications 22 in the form of file transfer protocol (FTP) files, e-mail, CD-ROM or direct dial-up input. Depending upon the format of the source document, a determination is made at 50 whether human intervention is required before the document is loaded into a content database indicated at 54. If the source document is suitable for automated distribution, such as a textual news story formatted for presentation automatically by the loading software, the information item is loaded directly into the content database after first making an implicit log entry at 56. An implicit log entry is a data entry in a log table corresponding to the information item which gives the information item a unique identification number, indicates its source, whether it has been distributed or not, date of the item, location of the information item in the database and other information, all entered automatically.

If human intervention is required, the source document is suspended, i.e., temporarily detained from entry into content database 54, as indicated by block 58. Further manual operations are performed depending upon whether the information item is numerical or structured data content, as shown by decision block 60. If the data is numeric or structured, the data is loaded after making an explicit log entry at 62. An explicit log entry is a manual entry of data into a log table containing the same type of information as an implicit log entry.

If the information item from decision block 60 is not numerical or structured, a decision is made at 64 as to whether the documents require extensive hypertext markup language (HTML) programming changes or modification of active server page (ASP) coding. If not, routine manual copying, editing and minor corrections to the information item are carried out at 66. This step may include addition, deletion or correction of HTMC tags. An implicit log entry is made at 68 and the information item is loaded into the content database 54. Most of the data loaded in this step consists of text-based content stored as text files marked up with HTML tags. These text (HTML) files are not meant to be directly served up by the web server, but rather used by ASP scripts to dynamically generate larger HTML content.

If ASP or HTML program changes are required, an extensive copying, editing and programming function is carried out at 70. HTML authoring, image creating and ASP coding require highly specialized manual operations grouped under the heading of Copy, Edit, Program shown at block 70. The output from this operation is processed by a content test server 72.

Quality assurance checks 74 are randomly carried out on information items stored in test server 72. If the quality check fails at decision point 76, the item is returned for re-processing. If it passes, the information item is cleared at block 78 for distribution. First a manual procedure "copy and touch files" is performed at 80. The files are copied from content test server 72 to a local IME server 84 serving the Information Management Enterprise and then "touched" (i.e., the last modified attribute of the file is set to the current date and time). If the source was previously suspended, it is unsuspended at block 82.

After the source document information is processed as described above, it passes to a distribution operation indicated generally by box 86. The distribution phase includes three general functions to be described later in detail. The first function is to create data packages for distribution from the content database 54, as indicated by box 88. The second function is to control distribution as indicated by box 90. The third function is to distribute "touched" ASP and HTML files as shown at box 92.

Log Tables

The incoming source documents are loaded into the content database 54 as previously described. Each record for an information item in a source document is uniquely identified with a sequential number. The record contains fields including a code number which identifies the publication source and the name of the publication in which the information item appeared, along with fields of other identifying attributes, and is stored as an information item in the content database. The record is stored as a row in a table in a relational database format in a manner known to those skilled in the art.

As previously described above, a corresponding implicit or explicit log entry for the information item is created either by automatic trigger, or by manual entry respectively. A log table entry, thus created for each information item identifies the information item by its ID number, its source ID, a date attributed to the information item, a code indicating its distribution status, and other attributes useful to the information distribution system.

Various log table entries are created according to the type of information item stored in the content database. The log tables are also stored in the content database. The log tables are created using standard SQL data definition language, with the "create table" command, which defines a table and all its attributes. The following section shows commands for creating a typical log tables D2LOG.NEW_RECENT_LOG mirroring a table of corresponding information items in the content database entitled D2LOG.NEWS_RECENT.

```
CREATE TABLE D2LOG.NEWS_RECENT_LOG
(
   ID        NUMBER(11)    NULL,
   SOURCEID VARCHAR2(5)    NULL,
   TRANS_TYPE CHAR(1)      NULL,
   DATE_STAMP DATE         DEFAULT SYSDATE NOT NULL,
   UNAME     VARCHAR2(20) DEFAULT 'USER' NOT NULL,
   DISTRIB   CHAR(1)   DEFAULT 'Y' NOT NULL,
   RKEY      CHAR(40)     NULL,
   CONSTRAINT DISTRIB_CHECK CHECK (upper(DISTRIB)
   IN('Y','N','M','W'))
)
PCTFREE 5
PCTUSED 90
INITRANS 1
MAXTRANS 255
TABLESPACE D2LOG
STORAGE(INITIAL 5M
   NEXT 5M
   MINEXTENTS 1
   MAXEXTENTS UNLIMITED
   PCTINCREASE 0)
NOPARALLEL
NOCACHCE;
```

For example, the table entitled "D2LOG.NEWS_RECENT_LOG" is a table of log entries corresponding to recent news information items in the content database located in a table "D2LOG.NEWS_RECENT". ID is the information item number, SOURCEID is the publication name, DATE_STAMP is the date of receipt, and DISTRIB is the field for a character indicating whether or not the information item has been distributed. RKEY is a pointer to the location of the information item in the content data base. The log tables provide a time/date tag to assist in determining whether or not information is new and whether or not it has been distributed.

Distribution of Information Items to Net Subscribers

The process of distributing information items to the local servers of subscribers over the publicly accessible global information network is depicted in the flow chart of FIG. 3. IPSDCC 30, the network distribution server 38 of the IME, and subscriber's local server 36 shown by the phantom line enclosures represent the physical locations of the programs and data shown by blocks within the enclosures. IPSDCC 30 and the network distribution server 38 are both normally located on the premises of the information management enterprise, while a subscriber local server 36 is located on the premises or located so as to serve the local area network of the network subscriber. Data is exchanged between network distribution server 38 and subscriber's local server 36 over the global information network in a manner to be described.

The content database 54 contains the tables of information items as well as the log table entries. Additional storage of data at location designated 100 entitled "entitlement database" keeps track of entitlements to view the data in specific publications which are published by specific restricted sources. The entitlements are in accordance with the Publisher Subscriber Agreement between the restricted publication source and the network subscriber.

Entitlements are a two level authorization process. A higher level entitlement indicates whether a given network subscriber is entitled to receive a given restricted publication. Lower level entitlement indicates which individual users (knowledge workers) within the organization are entitled to view a publication, once the publication is authorized for that particular enterprise or network subscriber. A typical entitlement database entry would indicate that business enterprise "A" is entitled to receive publication "X" and that individuals "1", "2"... "14" employed by "A" entitled to review the contents of publication "X".

A computer program 102 entitled "move all" resides on an IME computer (not shown) and is adapted to interact with the content database 54 and entitlement database storage 100, as well as a set of subscriber files 104, one for each network subscriber. A second computer program 106 entitled "create packs" is arranged to interact with entitlement database 100 and subscriber files 104.

The "move all" program 102 uses the log tables in content database 54 to determine what content is new or has been changed. The "create packs" program 106 assembles a file package for each network subscriber, after first referring to an entitlements file for the subscriber in entitlement table storage 100 to determine whether or not the network subscriber is entitled to view the publication. These packages are then placed on the network distribution server 38. A file transfer protocol (FTP) package ready for distribution is shown by reference numeral 108. FTP packages are only prepared for authorized subscribers. Another FTP package 110 on the server designates a returned file indicating distribution by having updating the subscriber's local server 36.

Lastly, the subscriber's local server 36 includes an FTP program 112 and a database update program 114. The subscriber's local server 36 is accessible by users of the subscriber, for example by being interconnected to a local area network for use by the knowledge workers of the local subscriber. The interface software on the subscriber's local server 36 is normally maintained by and under control of the information management enterprise.

Operation of the distribution process depicted in FIG. 3 takes place as follows.

Periodically, for example on a daily basis, the "move all" program 102 selects new information items from content database 54. This process is facilitated by the log tables containing the date and type of new items. The move all program inserts the identification of each information item into entitlement database 100 to check user entitlement information for the information item and writes the update information to the files 104 of subscribers entitled to receive the updated information items. Before creating an updated file package, the "create packs" program 106 reads file 110 on the network distribution server 38 to ascertain distribution status of the previous update. Program 106 creates an update file package for the entitled subscriber shown at 108, which is tailored to the update status of the local server, so as to update the server by transmitting only the new or undistributed information items required since the last update.

Periodically, in accordance with its own desired update schedule, the net subscriber causes FTP program 112 to utilize a file transfer protocol to download FTP package 108 to the local server 36. The FTP package is used with conventional SQL commands to update the local subscriber's relational database, whereupon the update report of FTP program 112 is transferred back over the global information network to network distribution server 38. The distribution records of the information items are therefore available for reading by "create packs" program in the next update cycle.

This describes the distribution process of timely information to the entitled network subscribers. The same network distribution server 38 services the local servers 36 all of the network subscribers 31 in various locations. Since only the new or update undistributed information is transmitted over the global information network, it is unnecessary to transmit historical content or unchanged information, thereby making the distribution process much more efficient than if entire documents were transmitted on a daily basis. Furthermore, since each net subscriber has an updated database of information items available, the system is not susceptible to disruption of information distribution, as it would be if all queries for information were directed to a central single database operated by an information service.

While there has been described what is considered to be the preferred embodiment of the invention, other modifications will occur to those skilled in the art, and it is desired to include in the appended claims all such modifications as fall within the true spirit and scope of the invention.

What is claimed is:

1. In an information distribution system having a plurality of restricted publication sources, each restricted publication source disseminating publications each containing at least one information item, said restricted publication sources having a list of network subscribers authorized to receive said publications, a plurality of authorized network subscribers, each having a local server with SQL software adapted to answer subscriber queries from an updatable relational database residing on said local server, and an information management enterprise (IME), having an information processing, storage and distribution control center (IPSDCC), said IPSDCC having a computer with database storage means for storing a content database, a log entry database, and an entitlement database, said IME also having a network distribution server:

a method for distributing timely information from said restricted publication sources via the IME to said authorized network subscribers over a publicly accessible global information network, the method comprising the steps of:

(a) receiving and storing in said entitlement database a list of authorized network subscribers to each publication from said restricted sources;

(b) receiving in said IPSDCC the publications transmitted by said restricted sources to the IPSDCC;

(c) categorizing, editing and storing information items from the publications in said content database;

(d) creating and storing in the log entry database a log entry for each said information item having codes assigned to the log entry indicating date of the information item, publication in which the information item appeared, location of the information item in the content database, and whether the information item has been distributed;

(e) periodically accessing the log entry database and retrieving corresponding new information items from the content database;

(f) selecting network subscribers authorized to receive the information items from the list of authorized network subscribers in the entitlement database;

(g) preparing file transfer packages of new information items for said selected network subscribers;

(h) distributing the new information items by placing the file transfer packages on the distribution server for access by the local servers of the network subscribers, so as to allow the authorized network subscribers to update their updatable relational databases over the global information network; and (i) altering the log entries for the new information items to indicate when they were distributed.

2. Method according to claim 1, including the additional steps of:

(c) accessing the log entry database and retrieving corresponding undistributed information items from the content database; and (d) distributing the undistributed items by placing file transfer packages on the distribution server.

3. Method according to claim 1, including the additional steps of:

(l) collecting additional publications from open publication sources and storing information items from the additional publications in the content database; and (m) carrying out steps (c), (d), (e), (g), (h), and (i) with respect to the information items from the additional publications.

4. Method according to claim 1, including the additional steps of:

(n) providing a Publisher Subscriber Agreement between each restricted source and each restricted network subscriber;

(o) providing an Electronic Distribution Agreement between each restricted source and the information management enterprise; and (p) providing a Distributor Service Agreement between each restricted network subscriber and the information management enterprise.

5. Method according to claim 1, wherein the selecting step (f) and preparing step (g) include the substeps of:

accessing the entitlements database;

identifying knowledge workers who are entitled to view the information item for a selected authorized network subscriber; and including knowledge worker entitlement data in the file transfer packages.

6. Method according to claim 1, wherein the categorizing, editing and storing step (c) and creating log entry step (d) comprise the substeps of:

automatically separating said information items received by the IPSDCC into first information items comprising timely textual news items, and other information items;

suspending said other information items from distribution;

automatically loading the first information items into the content database;

automatically creating an implicit log entry for each first information item;

manually editing and loading the other information items into the content database;

manually creating a log entry for the other information; items; and unsuspending the other information items to allow distribution.

7. Method according to claim 1, wherein the categorizing, editing and storing step (c) and creating log entry step (d) comprise the substeps of:

automatically separating said information items received by the IPSDCC into first information items comprising timely textual news items, second information items comprising structured numerical data and third information items requiring editing;

automatically loading the first information items into the content database;

automatically creating an implicit log entry for each first information item;

manually loading the second information items into the content database;

manually creating an explicit log entry for each second information item;

editing the third information items and manually loading them into the content database; and automatically creating an implicit log entry for each third information item.

* * * * *